United States Patent
Neubauer

(10) Patent No.: US 8,066,423 B2
(45) Date of Patent: Nov. 29, 2011

(54) HIGH SPEED AND DIRECT DRIVEN ROTATING EQUIPMENT FOR POLYOLEFIN MANUFACTURING

(75) Inventor: Anthony Charles Neubauer, Piscataway, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/970,053

(22) Filed: Dec. 16, 2010

(65) Prior Publication Data
US 2011/0085408 A1    Apr. 14, 2011

Related U.S. Application Data

(62) Division of application No. 11/280,630, filed on Nov. 16, 2005.

(51) Int. Cl.
*B29B 7/46* (2006.01)

(52) U.S. Cl. ............................................. 366/77; 366/84

(58) Field of Classification Search .................. 366/79, 366/81, 83–86, 88–90, 297–301, 318–324, 366/331, 77, 91; 425/204, 208, 209
See application file for complete search history.

(56) References Cited

U.S. PATENT DOCUMENTS

| 3,154,808 A | 11/1964 | Ahlefeld, Jr. et al. |
| 3,239,878 A | 3/1966 | Ahlefeld, Jr. et al. |
| 3,305,893 A | 2/1967 | Machen |
| 3,458,321 A | 7/1969 | Reinhart et al. |
| 3,700,374 A | 10/1972 | Matsuoka et al. |
| 3,734,257 A | 5/1973 | Eastcott et al. |
| 3,779,712 A | 12/1973 | Calvert et al. |
| 4,032,391 A | 6/1977 | Moked et al. |
| 4,077,904 A | 3/1978 | Noshay et al. |
| 4,115,639 A | 9/1978 | Brown et al. |
| 4,249,877 A | 2/1981 | Machen |
| 4,302,565 A | 11/1981 | Goeke et al. |
| 4,302,566 A | 11/1981 | Karol et al. |
| 4,336,213 A | 6/1982 | Fox |
| 4,385,883 A | 5/1983 | Hanslik |
| 4,408,888 A | 10/1983 | Hanslik |
| 4,452,750 A | 6/1984 | Handwerk et al. |
| 4,482,687 A | 11/1984 | Noshay et al. |
| 4,543,399 A | 9/1985 | Jenkins, III et al. |
| 4,564,605 A | 1/1986 | Collomb et al. |
| 4,588,790 A | 5/1986 | Jenkins, III et al. |
| 4,621,952 A | 11/1986 | Aronson |

(Continued)

FOREIGN PATENT DOCUMENTS

EP    0102503    3/1984

(Continued)

OTHER PUBLICATIONS

"Ohne Getriebe", Plastverarbeiter 53. Jahrg. (2002) Nr. 9, pp. 84-85 (XP01116280).

*Primary Examiner* — Charles E Cooley

(57) ABSTRACT

An apparatus and method for melting polymer is provided. In at least one embodiment, the apparatus includes a housing, two or more rotatable members at least partially contained within the housing, where each rotatable member having a shaft coupled thereto. The apparatus also includes a motor having a drive shaft directly coupled to the shaft of the rotatable members such that the rotatable members rotate at a speed of the motor drive shaft. The rotatable members are preferably non-intermeshing and counter-rotating.

5 Claims, 6 Drawing Sheets

U.S. PATENT DOCUMENTS

| | | | |
|---|---|---|---|
| 4,707,139 A | 11/1987 | Valenzky et al. | |
| 4,721,763 A | 1/1988 | Bailly et al. | |
| 4,741,264 A | 5/1988 | McPeak | |
| 4,803,251 A | 2/1989 | Goode et al. | |
| 4,879,359 A | 11/1989 | Chamla et al. | |
| 4,933,415 A | 6/1990 | Shimizu et al. | |
| 4,960,741 A | 10/1990 | Bailly et al. | |
| 4,994,534 A | 2/1991 | Rhee et al. | |
| RE33,683 E | 9/1991 | Allen et al. | |
| 5,093,415 A | 3/1992 | Brady, III et al. | |
| 5,156,794 A | 10/1992 | Nakanishi et al. | |
| RE34,172 E | 2/1993 | Gwinn et al. | |
| 5,200,477 A | 4/1993 | Baker et al. | |
| 5,288,933 A | 2/1994 | Kao et al. | |
| 5,290,745 A | 3/1994 | Jorgensen et al. | |
| 5,318,935 A | 6/1994 | Canich et al. | |
| 5,358,327 A * | 10/1994 | Derezinski et al. | 366/79 |
| 5,401,402 A | 3/1995 | Christy et al. | |
| 5,458,474 A | 10/1995 | Neubauer et al. | |
| 5,518,973 A | 5/1996 | Miro et al. | |
| 5,525,678 A | 6/1996 | Mink et al. | |
| 5,728,335 A | 3/1998 | Neubauer | |
| 5,782,560 A | 7/1998 | Hatanaka et al. | |
| 5,873,654 A | 2/1999 | Lu | |
| 5,889,128 A | 3/1999 | Schrock et al. | |
| 5,941,634 A | 8/1999 | Tynan et al. | |
| 6,271,325 B1 | 8/2001 | McConville et al. | |
| 6,333,389 B2 | 12/2001 | Whiteker et al. | |
| 6,402,360 B1 | 6/2002 | Nortey | |
| 6,523,727 B2 | 2/2003 | Lanham, Jr. | |
| 6,562,905 B1 | 5/2003 | Nummila et al. | |
| 6,627,713 B2 | 9/2003 | Bernier et al. | |
| 2003/0012838 A1 | 1/2003 | Middelberg | |
| 2003/0102588 A1 | 6/2003 | Tadros | |
| 2003/0127776 A1 * | 7/2003 | Carlson et al. | 264/406 |
| 2005/0063246 A1 * | 3/2005 | Ponzielli | 366/85 |
| 2005/0085591 A1 * | 4/2005 | Dozeman et al. | 525/192 |
| 2005/0163641 A1 | 7/2005 | Schunk et al. | |
| 2005/0179156 A1 * | 8/2005 | Carlson et al. | 264/40.1 |
| 2007/0109911 A1 * | 5/2007 | Neubauer | 366/77 |
| 2011/0085408 A1 * | 4/2011 | Neubauer | 366/77 |

FOREIGN PATENT DOCUMENTS

| | | |
|---|---|---|
| EP | 0103120 | 3/1984 |
| EP | 0213882 A2 | 3/1987 |
| EP | 0329810 A1 | 8/1989 |
| EP | 0545056 A1 | 6/1993 |
| EP | 0231102 | 3/1995 |
| EP | 0703246 | 1/2002 |
| EP | 1260346 A2 | 11/2002 |
| JP | 0768538 | 3/1995 |
| JP | 1028624 | 10/1998 |
| JP | 2003311814 | 11/2003 |
| JP | 200769372 | 3/2007 |
| WO | WO 99/01460 | 1/1999 |
| WO | WO 2004/094489 | 11/2004 |

* cited by examiner

HIGH SPEED AND DIRECT DRIVEN ROTATING EQUIPMENT FOR POLYOLEFIN MANUFACTURING

BACKGROUND OF THE INVENTION

1. Field of the Invention

Embodiments of the present invention generally relate to apparatus and methods for producing polymer. More particularly, embodiments of the present invention relate to apparatus and methods for extruding polyolefin using high speed, directly driven rotating equipment.

2. Description of the Related Art

Continuous mixers are the mainstay of many commercial polyolefin pelletizing production lines. A continuous mixer is different from an extruder in that continuous mixers are generally used only to melt and mix the resin, while extruders further provide pressure generation to force the molten resin through a die. Like extruders, continuous mixers can have one or multiple screws.

General features that distinguish various twin-screw mixers from other mixers are the relative direction of rotation and the degree of intermeshing of the rotors. Twin-screw mixers having rotors that rotate in the same direction are co-rotating twin-screw mixers. When the rotors rotate in opposite directions the machine is a counter-rotating mixer. The degree of intermeshing can vary from fully intermeshing to partially intermeshing to non-intermeshing, or tangential. Continuous mixers with rotating screws fully supported by external, oil lubricated bearings can be considered a more reliable and robust mixer compared to twin-screw extruders having rotating screws supported by the twin-screw extruder barrel(s) and lubricated by the polymer.

Continuous mixers are especially common for polyolefin production, and are typically used in conjunction with gear pumps to reach pressure requirements for forcing the molten polymer through the die. As such, the rates through the mixer and the gear pump must be compatible. Typically, gear reducers are attached to the mixer motor and/or gear pump motor to control the respective motor speeds and throughput so that the machines can operate at cooperative rates. See, for example, U.S. Pat. Nos. 4,032,391; 4,336,213; 4,452,750; 5,458,474; and 5,728,335. Such additional components are expensive, require maintenance time and expense, consume energy, and often lack in efficiency. Also, such components have large space requirements within the fabrication facility.

Direct driven extruders have been described in the literature. See, for example, U.S. Pat. Nos. 4,249,877; 4,741,264; and 2003/0012838 A1. However, direct driven continuous mixers have not been introduced nor have pelletizing systems that utilize direct driven mixers and gear pumps. As mentioned above, designers of continuous mixers are faced with all different design criteria and operating requirements than extruders. There is a need, therefore, for a reliable continuous mixer and gear pump that can operate without gear reduction to decrease capital, maintenance and operating costs.

SUMMARY OF THE INVENTION

Apparatus and methods for extruding polymer are provided. In at least one specific embodiment, the apparatus includes a housing, two or more rotatable members at least partially contained within the housing, where each rotatable member having a shaft coupled thereto. The apparatus also includes a motor having a drive shaft directly coupled to the shaft of at least one of the rotatable members such that the rotatable member rotates at a speed of the motor drive shaft. The rotatable members are preferably non-intermeshing and counter-rotating In at least one other specific embodiment, the apparatus includes a first housing having two or more screws contained therein. A first motor is directly coupled to at least one of the two or more screws and adapted to rotate the two or more rotatable screws. A second housing is provided and is in fluid communication with the first housing. The second housing includes two or more gears contained therein. A second motor is directly coupled to at least one of the two or more gears and adapted to rotate the two or more rotatable gears In at least another specific embodiment, the method for polyolefin production includes directing a polyolefin through a twin screw extruder or continuous mixer to provide a molten polymer where the twin screw extruder or continuous mixer includes a housing having two or more screws contained therein; and a motor directly coupled to at least one of the two or more screws and adapted to rotate the screws at a rate of about 450, 514, 600, 720, 900, 1200 rpm or more. One or more additives can be added to the molten polymer within the first housing. The molten polymer and the one or more additives are mixed to provide a mixed polymer comprising the one or more additives at least partially dispersed therein. The mixed polymer is directed to a gear pump that includes a housing having two or more gears contained therein, and a motor directly coupled to the two or more gears and adapted to rotate the one or more gears at a rate of about 10 rpm to about 1200 rpm. The mixed polymer is then pressurized within the gear pump to transfer the mixed polymer for further processing.

In at least another specific embodiment, the method includes providing polyolefin particles to a twin screw extruder or continuous mixer where the twin screw extruder or continuous mixer includes a housing having two or more rotatable members contained therein. Each rotatable member has a shaft coupled thereto. A motor having a drive shaft is directly coupled to the shaft of at least one of the two or more rotatable members. The two or more rotatable members are rotated at a speed of the motor drive shaft without gear reduction. The polymer particles are melted within the housing to provide a polymer melt, and the polymer melt is advanced through the housing.

DETAILED DESCRIPTION

Figure 1:
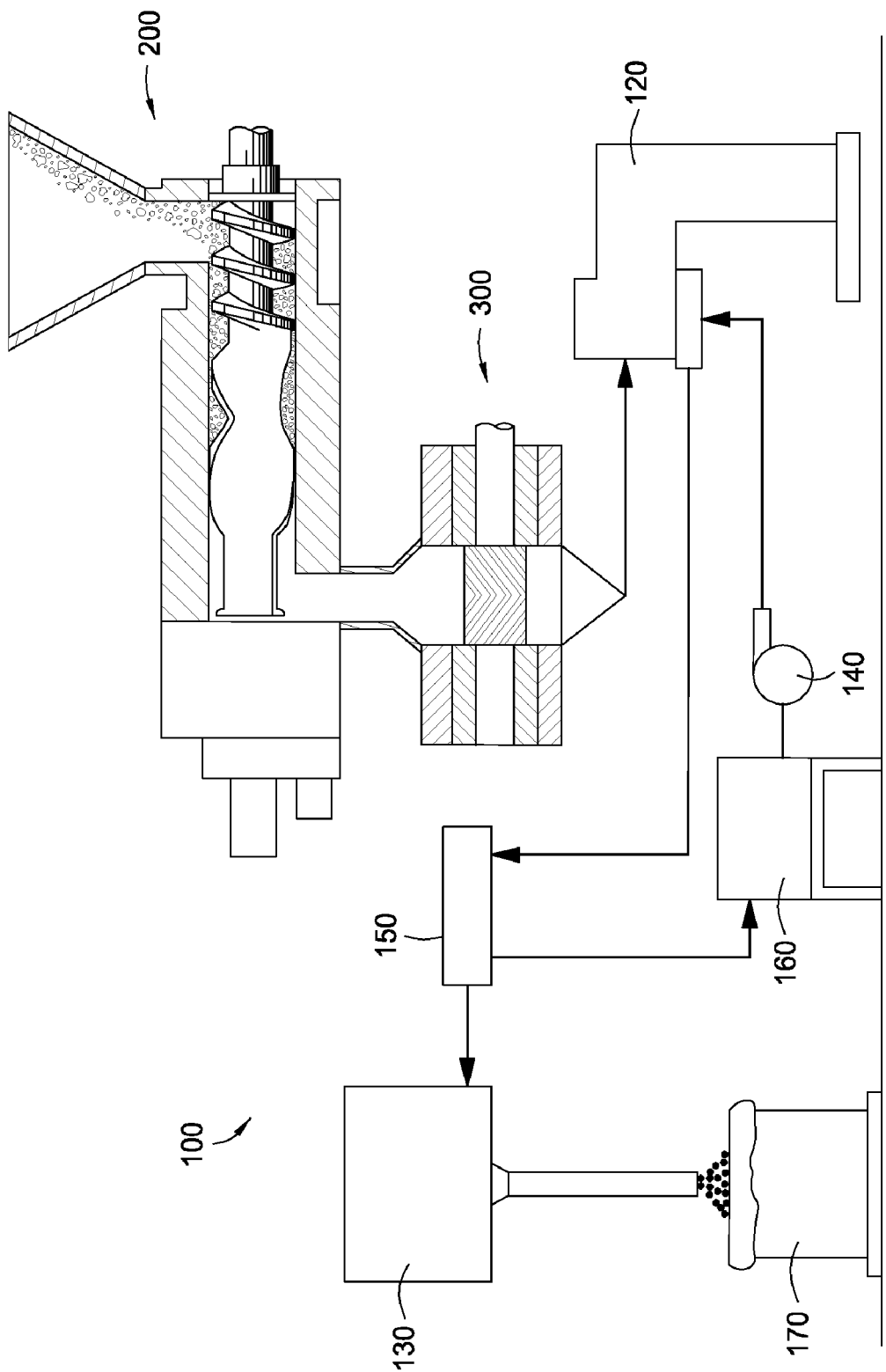
FIG. 1 is a schematic diagram showing a typical polymer pelletizing system.

FIG. 1 is a schematic diagram showing an illustrative polymer pelletizing system 100. The pelletizing system 100 includes one or more pelletizers 120, drier systems 130, pumps 140, screens 150, surge tanks 160, material containers 170, continuous mixers 200, and gear pumps 300. In operation, a polymer is introduced to the mixer 200 where the polymer is melted and mixed. The polymer then passes from the mixer 200 to the gear pump 300. The gear pump 300 passes the molten polymer to the pelletizer 120. Pelletizers are well known, and any pelletizer or pelletizing system can be used. Preferably, an underwater pelletizer commercially available from Berstorff, Coperion W&P, Farrel, Gala, Japan Steel Works, Kobe Steel, and so on. At the discharge end of the pelletizer 120, the polymer is slurried to the drier system 140 through a hydraulic loop containing a pump 140, separator screen 150 and surge tank 160. The screen 150 separates the conveying liquid (water) from the pelletized polymer. The separated polymer passes to the drier system 130. Drier systems are well known. Preferably, the drier system 130 is a centrifugal drier, such as those commercially available from Carter Day, Gala, and so on. From the drier system 130, the polymer is discharged to storage and/or transportation. Typically, the dried, pelletized polymer is discharged to a bulk material box 170, as shown in FIG. 1.

Figure 2A:
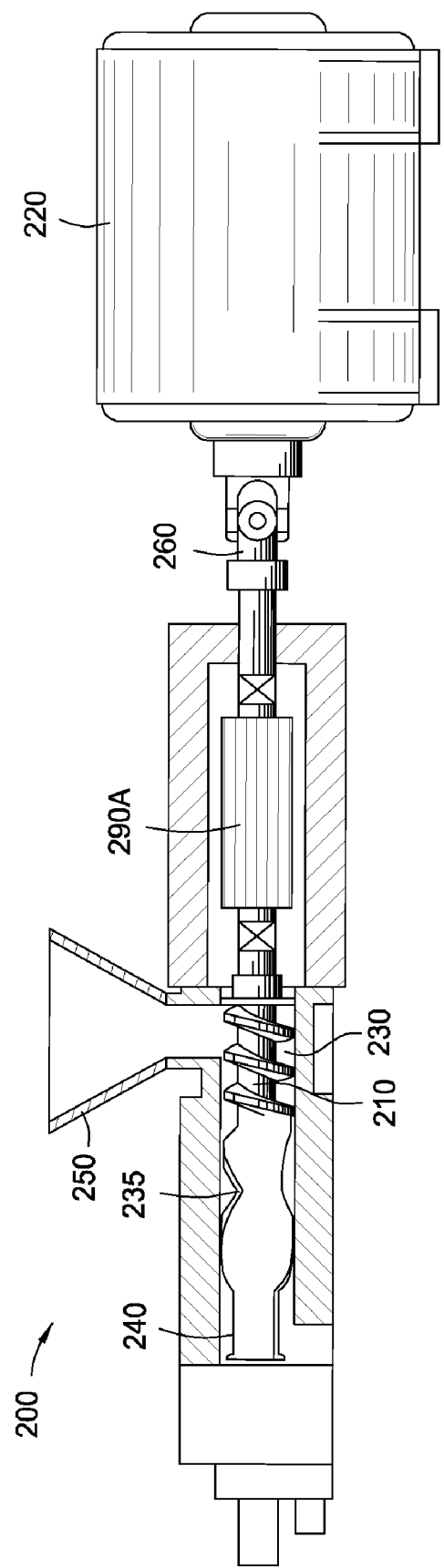
FIG. 2A is a schematic elevation view of an illustrative continuous mixer having at least one rotating screw directly coupled to a motor.

FIG. 2A is a schematic elevation of an illustrative continuous mixer. The continuous mixer 200 includes at least one rotating screw 210 directly coupled to a motor 220. A gravitational feed hopper 250 receives the polymer to be processed in whatever form desired. The continuous mixer 200 can include a plurality of successive melting and mixing stages or zones. For example, the mixer 200 can include a feed zone 230, melting zone 235 and mixing zone 240.

Figure 2B:
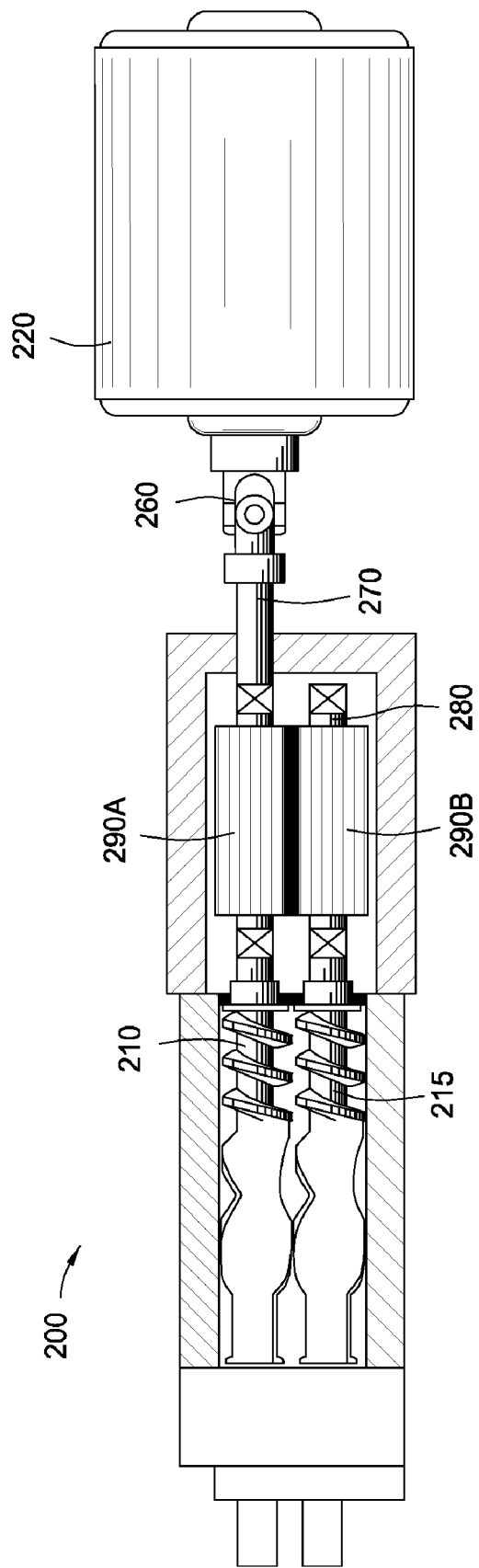
FIG. 2B is a schematic plan view of an illustrative continuous mixer having at least two rotating screws directly coupled to a motor.

FIG. 2B is a schematic plan view of an illustrative continuous mixer having at least two rotating screws directly coupled to the motor 220. As shown, the screws 210, 215 are directly coupled to the motor 220 through a coupling member 260. The term "coupling member" refers to a mechanical device that is used to transmit mechanical power from one member to another. For example, the coupling member 260 transmits the rotating mechanical power from the motor 220 to the screws 210, 215 via shaft 270. Preferably, the coupling member 260 is a flexible element type or gear type, such as those commercially available from Rexnord.

The shaft 270 is directly coupled to the motor 220 and transmits rotational power to a second shaft 280 via the gears 290A,B. Typically, the gears 290A,B have exactly the same number of teeth, and therefore the speed of the second shaft 280 is substantially the same or exactly the same as the first shaft 270 that is directly coupled to the motor 220. For this case, such gears 290A,B are sometimes called "timing" gears.

The motor 220 can be any motor capable of producing the requisite horsepower and speed. The mixer 200 can be operated at a single, constant speed using a single speed motor. In one or more embodiments, the mixer 200 can be operated at two or more fixed speeds by using a multiple speed motor. In yet another embodiment, the mixer 200 can be operated at variable speeds using a variable speed motor.

In one or more embodiments, the speed of the motor 220 can be about 450 rpm or more. Preferably, the speed of the motor 220 ranges from a low of about 600 rpm, or about 720 rpm or about 900 rpm to a high of about 1200 rpm, or about 1800 rpm, or about 3600 rpm. Such exemplary speeds are based on a power supply system operating at a frequency of 60 Hz. If the power supply system has a higher or lower operating frequency, e.g., 50 Hz, these speeds can easily be adjusted accordingly.

A starting motor can be used to start the machine and to rotate it at reduced speed to ensure that it turns freely and also, in some cases, to avoid the shock of a full power, full speed start. The operator-controlled variables used to control the performance of the mixer include a slot or throttle valve, melt pump suction pressure, and (to an extent) varying the speed. Controlling the feed rate is usually not a commercially desirable option because the mixer is in-line with the reactor. Heating and/or cooling of the barrels and rotors is usually used to improve performance of the mixer.

Figure 3A:
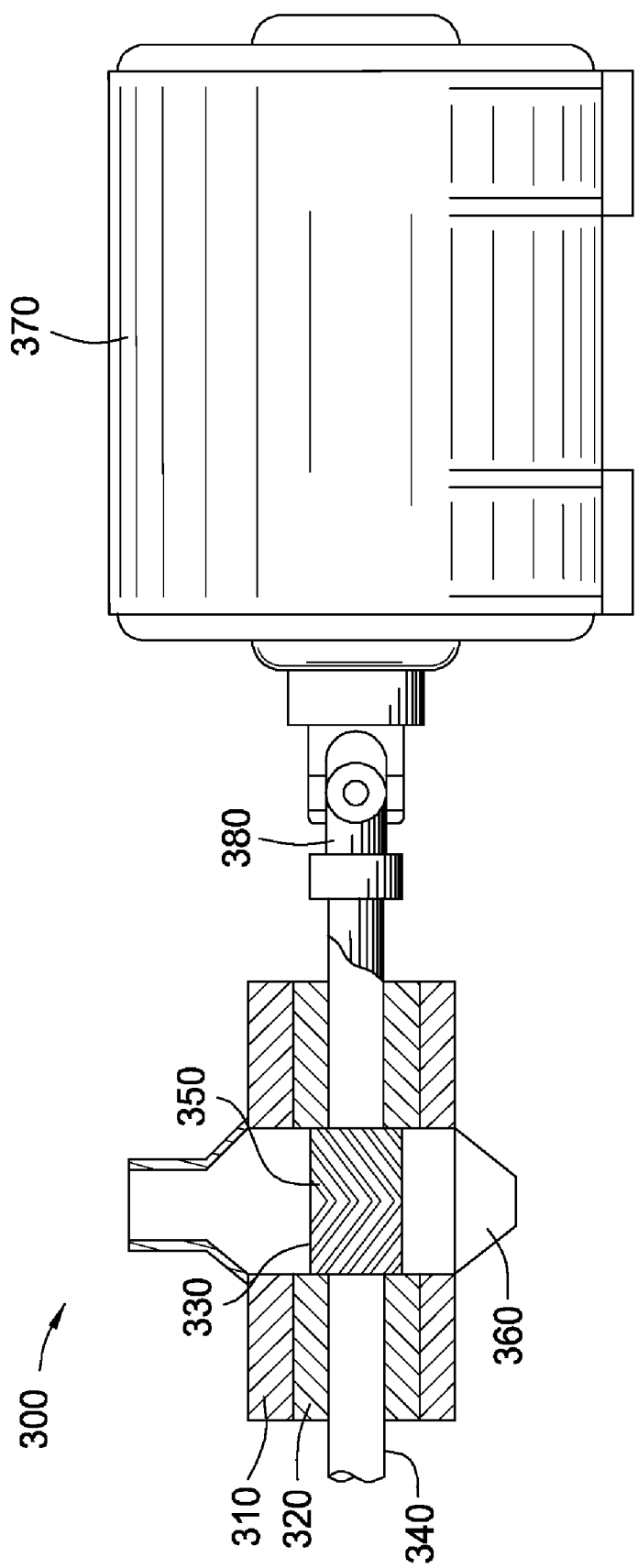
FIG. 3A is a schematic elevation view of an illustrative melt pump or gear pump having at least one rotating gear directly coupled to a motor.
Figure 3B:
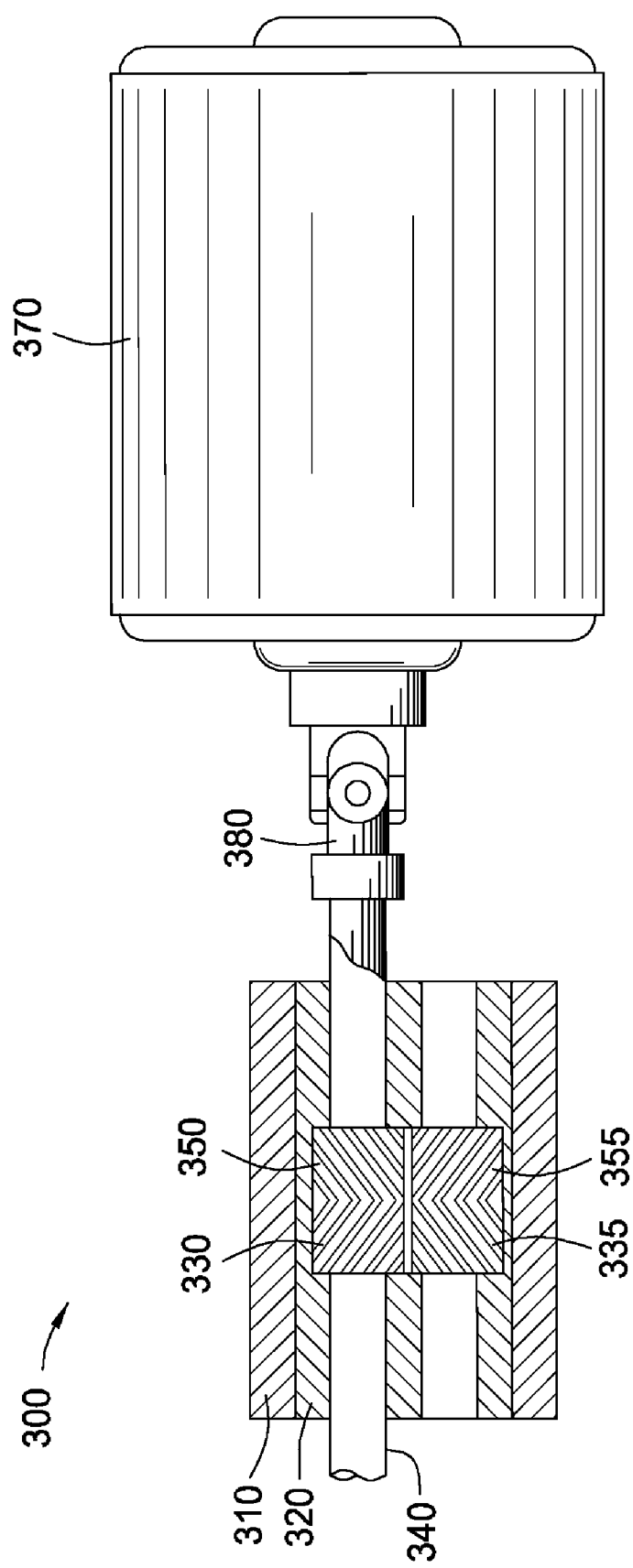
FIG. 3B is a schematic plan view of an illustrative gear pump having at least two rotating gear directly coupled to a motor.

FIG. 3A is schematic elevation view of an illustrative gear pump 300 (i.e., "melt pump") having at least one rotating gear directly coupled to a motor 370. In one or more embodiments, the gear pump 300 includes a housing member 310, inner bearing sleeve 320, gear members 330, and rotary drive shaft 340. FIG. 3B is a schematic plan view of the illustrative gear pump 300 having at least one rotating gears directly coupled to the motor 370. In this embodiment, the gear member is a pair of counter-rotating intermeshing gears 330, 335 having herringbone teeth 350 which intermesh with the teeth of the opposite gear member 330. In one or more embodiments, the "external timing gears" are not required. Instead, the gear 330 that is coupled to the motor 370 in conjunction with the "pumping" polymer can be sufficient to drive the second "pumping" gear 335.

Referring to FIGS. 3A and 3B, the outer walls of the gear pump 300 enclosing the gear members 330 are curved to contour the outer surface of the gears and are spaced so as to have a decreasing hydraulic radius in the downstream direction within the gear pump 300. In this way, the molten thermoplastic material passing through the upper end of the gear pump 300 forms a pool of material above the pair of gear members 330 and passes material around the outer gear pair in the space between the gear members 330 and the walls to a point of discharge through outlet 360. The outlet 360 preferably has a smooth and gradual transition which changes from a slot-like opening adjacent the gear members 330 to form a circular discharge outlet at its lower end.

The housing member 310 in which the gear members 330, 335 are located is designed to achieve an inlet of minimum restriction of polymer flow to improve volumetric efficiency. Substantially all of the faces of the gear members 330, 335 are exposed to the media free space (the volume between the gear faces and walls of the chamber housing member 310). This configuration permits the development of a pressure gradient within the media free space to facilitate the filling of the gear tooth cavities with polymer.

The drive shaft 340 is connected to one of the gear members (i.e., the drive gear member 330) and extends outwardly from the gear pump 300. The drive shaft 340 is directly coupled to the motor 370 via a coupling member 380. In the two gear configuration of FIG. 3B, the second gear member 335 is driven by the intermeshing relationship of the drive gear member 330 that is directly driven by the motor 370.

In similar fashion to coupling member 220, the term "coupling member 380" refers to a mechanical unit that is used to transmit mechanical power from one member to another. For example, the coupling member 380 transmits rotating mechanical power from the motor 370 to the gear pump 300. Preferably, the coupling member 380 is a flexible element type, universal joint type, gear type, such as those commercially available from Rexnord.

The motor 370 can be any motor capable of producing the requisite horsepower and speed. The gear pump 300 is typically operated at a variable speed that is dependent on the rate of the mixer. In other words, when the mass rate of the mixer increases, the speed of the gear pump increases proportionately. Typically, the speed of the gear pump varies between about 10 rpm and about 1200 rpm. In one or more embodiments, the speed of the gear pump can range between a low of about 10 rpm, 50 rpm, or 100 rpm and a high of about 500 rpm, about 600 rpm, or about 1200 rpm. In one or more embodiments, the gear pump may operate within a range of about 20 rpm to about 40 rpm.

The gear members 330 can have any configuration. Illustrative configurations include, but are not limited to, helical, spur, and herringbone gears which completely intermesh. Preferably, the gear pump 300 includes a pair of intermeshing herringbone gear members 330, 335 that are rotatably mounted in the housing member 310 as shown in FIG. 3B. The herringbone gear members 330 can have helix angles ranging up to 30°; however, smaller helix angles, 15° or less, can be used to minimize leakage at gear intermesh. The use of herringbone pattern gears is preferred to constant helical or spur gears due to reduced stress loading on the gears and housing realized with the herringbone gears.

The gear pump 300 further includes a sealed transition piece (not shown) since the gear pump 300 is pressurized to assure adequate tooth filling of the gear members 330. The pressure in this transition piece can range from less than 10 psig to over 250 psig. Pressure in the inlet transition piece can be controlled by speeding up or slowing down the rotation of the gear members 330 to maintain the set pressure. To assure adequate pressure sensing, a pressure indicating device (not shown) can be installed at a location close to the pump inlet. A more detailed description of the gear pump 300 internals can be found in U.S. Pat. No. 4,032,391.

The illustrative pelletizing system 100 shown and described with reference to FIG. 1 is suitable for use with any polymerization process. Suitable polymerization processes include solution, gas phase, slurry phase and a high pressure process, or a combination thereof. A desirable process is a gas phase or slurry phase polymerization of one or more olefins at least one of which is ethylene or propylene.

Gas Phase Polymerization

Figure 4:
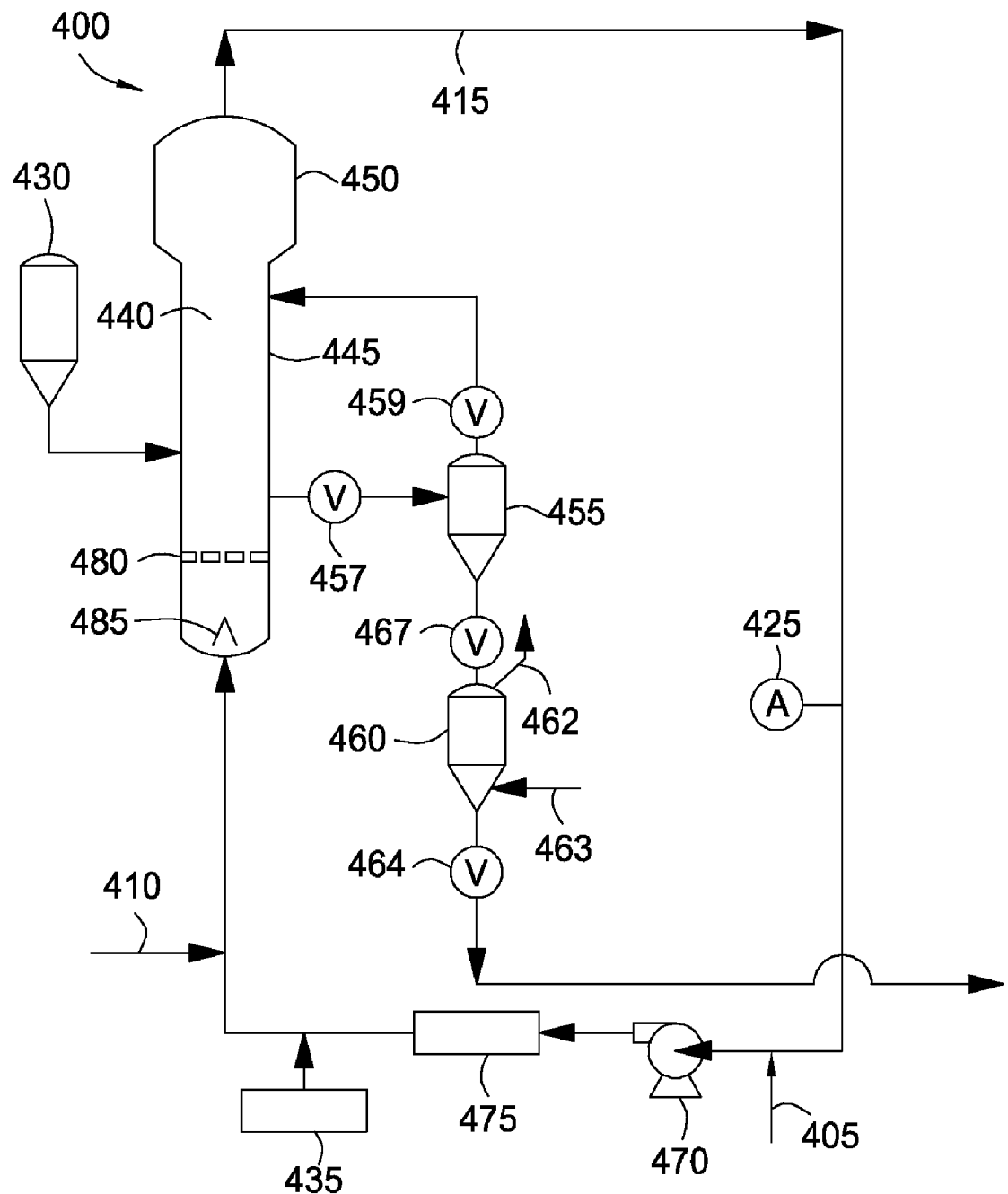
FIG. 4 is a flow diagram of a process for making polyethylene resin.

FIG. 4 is a flow diagram of an illustrative gas phase system for making polyethylene. In one or more embodiments, the system 400 can include a reactor 440 in fluid communication with one or more discharge tanks 455 (only one shown), surge tanks 460 (only one shown), and recycle compressors 470 (only one shown). The polymerization system 400 can also include more than one reactor 440 arranged in series, parallel, or configured independent from the other reactors, each reactor having its own associated tanks 455, 460 and compressors 470 or alternatively, sharing any one or more of the associated tanks 455, 460 and compressors 470. For simplicity and ease of description, embodiments of the invention will be further described in the context of a single reactor train.

In one or more embodiments, the reactor 440 can include a reaction zone 445 in fluid communication with a velocity reduction zone 450. The reaction zone 445 can include a bed of growing polymer particles, formed polymer particles and catalyst particles fluidized by the continuous flow of polymerizable and modifying gaseous components in the form of make-up feed and recycle fluid through the reaction zone 445.

Referring now to FIG. 4, a feed stream 405 can be directed to enter the cycle line before the blower but may also be at any point in the polymerization system including to the reactor fluid bed, the expanded section or to the cycle line before or after the cooler as depicted with alternative feed stream location 410. The term "feed stream" as used herein refers to a raw material, either gas phase or liquid phase, used in a polymerization process to produce a polymer product. For example, a feed stream may be any olefin monomer including substituted and unsubstituted alkenes having two to 12 carbon atoms, such as ethylene, propylene, 1-butene, 1-pentene, 4-methyl-1-pentene, 1-hexene, 1-octene, 1-decene, 1-dodecene, styrene, and derivatives thereof. The feed stream also includes non-olefinic gas such as nitrogen and hydrogen. The feeds may enter the reactor at multiple and different locations. For example, monomers can be introduced into the polymerization zone in various ways including direct injection through a nozzle (not shown in the drawing) into the bed. The feed stream may further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof.

For the purpose of polymerization with chromium oxide type catalysts, the gas mole ratio of hydrogen to ethylene in the reactor is typically in the range of about 0 to 0.5, more typically in the range of 0.01 to 0.4 and most typically in the range of 0.03 to 0.3. A preferred embodiment includes the addition of hydrogen gas. The use of hydrogen affects the polymer molecular weight and distribution, and ultimately influences the polymer properties.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone 445, the superficial gas velocity through the bed must exceed the minimum flow required for fluidization. Preferably, the superficial gas velocity is at least two times the minimum flow velocity. Ordinarily, the superficial gas velocity does not exceed 5.0 ft/sec and usually no more than 2.5 ft/sec is sufficient.

In general, the height to diameter ratio of the reaction zone 445 can vary in the range of from about 2:1 to about 5:1. The range, of course, can vary to larger or smaller ratios and depends upon the desired production capacity. The cross-sectional area of the velocity reduction zone 450 is typically within the range of about 2 to about 3 multiplied by the cross-sectional area of the reaction zone 445.

The velocity reduction zone 450 has a larger inner diameter than the reaction zone 445. As the name suggests, the velocity reduction zone 450 slows the velocity of the gas due to the increased cross sectional area. This reduction in gas velocity drops the entrained particles into the bed, allowing primarily only gas to flow from the reactor 440. That gas exiting the overhead of the reactor 440 is the recycle gas stream 415.

The recycle stream 415 is compressed in a compressor 470 and then passed through a heat exchange zone where heat is removed before it is returned to the bed. The heat exchange zone is typically a heat exchanger 475 which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor 440. The cooled recycle stream absorbs the heat of reaction generated by the polymerization reaction.

Preferably, the recycle stream is returned to the reactor 440 and to the fluidized bed through a gas distributor plate 480. A gas deflector 485 is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa.

An illustrative deflector suitable for this purpose is described in U.S. Pat. Nos. 4,933,415 and 6,627,713.

An activated precursor composition with or without an aluminum alkyl modifier (hereinafter collectively referred to as catalyst) is preferably stored for service in a catalyst reservoir 430 under a blanket of a gas which is inert to the stored material, such as nitrogen or argon. Preferably, the catalyst reservoir 430 is equipped with a feeder suitable to continuously feed the catalyst into the reactor 440. An illustrative catalyst reservoir is shown and described in U.S. Pat. No. 3,779,712, for example. A gas that is inert to the catalyst, such as nitrogen or argon, is preferably used to carry the catalyst into the bed. Preferably, the carrier gas is the same as the blanket gas used for storing the catalysts in the catalyst reservoir 430. In one embodiment the catalyst is a dry powder and the catalyst feeder comprises a rotating metering disk. In another embodiment the catalyst is provided as a slurry in mineral oil or liquid hydrocarbon or mixture such as for example propane, butane, isopentane, hexane, heptane or octane. An illustrative catalyst reservoir is shown and described in WO 2004/094489. The catalyst slurry may be delivered to the reactor with a carrier fluid, such as, for example, nitrogen or argon or a liquid such as for example isopentane or other C3 to C8 alkane. It is possible to modify the catalyst during delivery to the reactor along the feed addition line with the aluminum alkyl modifiers, which are described elsewhere herein.

The catalyst is injected at a point into the bed where good mixing with polymer particles occurs. For example, the catalyst is injected into the bed at a point above the distributor plate 480. Injecting the catalyst at a point above the distribution plate 480 provides satisfactory operation of a fluidized-bed polymerization reactor. Injection of the catalyst into the area below the distributor plate 480 could cause polymerization to begin there and eventually cause plugging of the distributor plate 480. Injection directly into the fluidized bed aids in distributing the catalyst uniformly throughout the bed and tends to avoid the formation of localized spots of high catalyst concentration which can cause "hot spots" to form. Injection of the catalyst into the reactor 440 above the bed can result in excessive catalyst carryover into the recycle line 415 where polymerization could occur leading to plugging of the line 415 and heat exchanger 475.

The modifier compound (e.g., an aluminum alkyl compound, a non-limiting illustrative example of which is triethyl aluminum), can be added to the reaction system either directly into the fluidized bed or downstream of the heat exchanger 475, in which case the modifier is fed into the recycle system from a dispenser 435. The amount of modifier added to the polymerization reactor when using the chromium oxide catalyst and particularly the titanated chromium oxide based catalyst can be, broadly speaking, in the range of about 0.005 to about 10 modifier to chromium on a molar basis, or more narrowly in the range of about 0.01 to 5 and even more narrowly in the range of about 0.03 to 3 and most narrowly in the range of 0.05 to 2.

The polymerization reaction is conducted substantially in the absence of catalyst poisons such as moisture, oxygen, carbon monoxide and acetylene. However, oxygen can be added back to the reactor at very low concentrations to alter the polymer structure and its product performance characteristics. Oxygen may be added at a concentration relative to the ethylene feed rate to the reactor of about 10 to 600 ppbv, and more preferably about 10 to 500 ppbv.

In order to achieve the desired density ranges in the copolymers it is necessary to copolymerize enough of the comonomers with ethylene to achieve a level of about 0 to anywhere from 5 to 10 weight percent of the comonomer in the copolymer. The amount of comonomer needed to achieve this result will depend on the particular comonomer(s) being employed, the activation temperature of the catalyst and its formulation. The ratio of the comonomer to ethylene should be controlled to obtain the desired resin density of copolymer product.

A gas analyzer 425 can be used to determine the composition of the recycle stream and the composition of the make-up feed stream 405 and 410 can be adjusted accordingly to maintain an essentially steady state gaseous composition within the reaction zone 445. The gas analyzer 425 can be a conventional gas analyzer that determines the recycle stream composition to maintain the ratios of feed stream components. Such equipment is commercially available from a wide variety of sources. The gas analyzer 425 may be positioned to receive gas from a sampling point located between the velocity reduction zone 450 and heat exchanger 475.

The rate of polymer production in the bed depends on the rate of catalyst injection and the concentration of monomer(s) in the reaction zone. The production rate is conveniently controlled by adjusting the rate of catalyst injection. Since any change in the rate of catalyst injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particulate polymer formation at a constant fluid velocity if no or negligible vaporizable liquid is present in the inlet fluid.

On discharge of particulate polymer product from reactor 440, it is desirable and preferable to separate fluid from the product and to return the fluid to the recycle line 415. There are numerous ways known to the art to accomplish this separation. In one or more embodiments, fluid and product leave the reactor 440 and enter the product discharge tanks 455 (one is shown) through valve 457, which may be a ball valve designed to have minimum restriction to flow when opened. Positioned above and below the product discharge tank 455 are conventional valves 459, 467. The valve 467 allows passage of product into the product surge tanks 460 (only one is shown).

In a typical mode of operation, valve 457 is open and valves 459,467 are in a closed position. Product and fluid enter the product discharge tank 455. Valve 457 closes and the product is allowed to settle in the product discharge tank 455. Valve 459 is then opened permitting fluid to flow from the product discharge tank 455 to the reactor 445. Valve 459 is then closed and valve 467 is opened and any product in the product discharge tank 455 flows into the product surge tank 460. Valve 467 is then closed. Product is then discharged from the product surge tank 460 through valve 464. The product can be further purged via purge stream 463 to remove residual hydrocarbons and conveyed to the pelletizing system 100 described above or to storage (not shown). The particular timing sequence of the valves 457, 459, 467, 464 is accomplished by the use of conventional programmable controllers which are well known in the art.

Another preferred product discharge system which may be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor is equipped with an adequate venting system (not shown) to allow venting the bed during start up and shut down. The reactor does not require the use of stirring and/or wall scraping. The recycle line 415 and the elements therein (compressor 470, heat exchanger 475) should be smooth surfaced and devoid of unnecessary obstructions so as not to impede the flow of recycle fluid or entrained particles.

Various techniques for preventing fouling of the reactor and polymer agglomeration can be used. Illustrative of these techniques are the introduction of finely divided particulate matter to prevent agglomeration, as described in U.S. Pat. Nos. 4,994,534 and 5,200,477; the addition of negative charge generating chemicals to balance positive voltages or the addition of positive charge generating chemicals to neutralize negative voltage potentials as described in U.S. Pat. No. 4,803,251. Antistatic substances may also be added, either continuously or intermittently to prevent or neutralize electrostatic charge generation. Condensing mode operation such as disclosed in U.S. Pat. Nos. 4,543,399 and 4,588,790 can also be used to assist in heat removal from the fluid bed polymerization reactor.

The conditions for polymerizations vary depending upon the monomers, catalysts and equipment availability. The specific conditions are known or readily derivable by those skilled in the art. For example, the temperatures are within the range of from about $-10°$ C. to about $120°$ C., often about $15°$ C. to about $110°$ C. Pressures are within the range of from about 0.1 bar to about 100 bar, such as about 5 bar to about 50 bar, for example. Additional details of polymerization can be found in U.S. Pat. No. 6,627,713, which is incorporated by reference at least to the extent it discloses polymerization details.

Catalyst System

Any olefin polymerization catalyst or catalyst system can be used to produce the polyolefin described. For example, the catalyst or catalyst system can include Ziegler-Natta catalysts, chromium-based catalysts, metallocene catalysts and other single-site catalysts, and bimetallic catalysts. The catalyst or catalyst system can also include $AlCl_3$, cobalt, iron, palladium, chromium/chromium oxide or "Phillips" catalysts. Any catalyst can be used alone or in combination with the others. In one or more embodiments, a "mixed" catalyst system is preferred.

The term "catalyst system" includes at least one "catalyst component" and at least one "activator", alternately at least one cocatalyst. The catalyst system may also include other components, such as supports, and is not limited to the catalyst component and/or activator alone or in combination. The catalyst system may include any number of catalyst components in any combination as described, as well as any activator in any combination as described.

The term "catalyst component" includes any compound that, once appropriately activated, is capable of catalyzing the polymerization or oligomerization of olefins. Preferably, the catalyst component includes at least one Group 3 to Group 12 atom and optionally at least one leaving group bound thereto.

As used herein, in reference to Periodic Table "Groups" of Elements, the "new" numbering scheme for the Periodic Table Groups are used as in the CRC Handbook of Chemistry and Physics (David R. Lide, ed., CRC Press $81^{st}$ ed. 2000).

The term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like.

Metallocenes are generally described throughout in, for example, 1 & 2 METALLOCENE-BASED POLYOLEFINS (John Scheirs & W. Kaminsky, eds., John Wiley & Sons, Ltd. 2000); G. G. Hlatky in 181 Coordination Chem. Rev. 243-296 (1999) and in particular, for use in the synthesis of polyethylene in 1 METALLOCENE-BASED POLYOLEFINS 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material in an embodiment, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1, 2-9]anthrene, thiophenoindenyl, thiophenofluorenyl, hydrogenated versions thereof (e.g., 4,5,6,7-tetrahydroindenyl, or "$H_4Ind$"), substituted versions thereof, and heterocyclic versions thereof.

The "Group 15-containing catalyst" may include Group 3 to Group 12 metal complexes, and Group 4 metals in a particular embodiment wherein the metal is 2 to 8 coordinate, 2 to 4 coordinate in a particular embodiment, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. Nos. 5,318,935; 5,889,128 6,333,389 B2 and U.S. Pat. No. 6,271,325 B1. In one embodiment, the Group 15-containing catalyst includes a Group 4 imino-phenol complexes, Group 4 bis(amide) complexes, and Group 4 pyridyl-amide complexes that are active towards olefin polymerization to any extent.

The term "activator" includes any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments described are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

Lewis acids may be used to activate the metallocenes described. Illustrative Lewis acids include, but are not limited to, alumoxane (e.g., "MAO"), modified alumoxane (e.g., "TIBAO"), and alkylaluminum compounds. Ionizing activators (neutral or ionic) such as tri (n-butyl)ammonium tetrakis (pentafluorophenyl)boron may be also be used. Further, a trisperfluorophenyl boron metalloid precursor may be used. Any of those activators/precursors can be used alone or in combination with the others.

MAO and other aluminum-based activators are known in the art. Ionizing activators are known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). The activators may be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347-1374 (2000).

Illustrative Ziegler-Natta catalyst compounds are disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565; 5,518,973; 5,525,678; 5,288,933; 5,290, 745; 5,093,415 and 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used include transition metal compounds from Groups 3 to 17, or Groups 4 to 12, or Groups 4 to 6 of the Periodic Table of Elements.

These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds for the above conventional-type transition metal catalyst compounds may be represented by the formula $M^3M^4_vX^2_cR^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, terms "bimetallic catalyst composition," "bimetallic catalyst," "multi-catalyst composition," and "multi-catalyst" will be collectively referred to herein as a "mixed catalyst system" unless specifically noted otherwise.

In at least one specific embodiment, the apparatus for extruding polymer includes a housing and two or more rotatable members at least partially contained within the housing. Each rotatable member has a shaft coupled thereto. The apparatus further includes a motor having a drive shaft directly coupled to the shaft of at least one of the rotatable members such that the directly coupled rotatable member rotates at a speed of the motor drive shaft. In one or more embodiments above or elsewhere herein, the rotatable members are non-intermeshing and counter-rotating.

In at least one other specific embodiment, the apparatus for transferring molten polymer includes a first housing having two or more screws contained therein. A first motor is directly coupled to at least one of the two or more screws and adapted to rotate the one or more rotatable screws at a rate of about 1200 rpm or more. A second housing is provided and is in fluid communication with the first housing. The second housing includes two or more gears contained therein. A second motor is directly coupled to the two or more gears and adapted to rotate the one or more rotatable gears at a rate of about 10 rpm to about 1200 rpm.

In at least another specific embodiment, the method for polyolefin production includes directing a polyolefin through a twin screw extruder or continuous mixer to provide a molten polymer where the twin screw extruder or continuous mixer includes a housing having two or more screws contained therein; and a motor directly coupled to at least one of the two or more screws and adapted to rotate the directly coupled screw at a rate of about 450, 514, 600, 720, 900, 1200 rpm or more. One or more additives are added to the molten polymer within the first housing. The molten polymer and the one or more additives are mixed to provide a mixed polymer comprising the one or more additives at least partially dispersed therein. The mixed polymer is directed to a gear pump that includes a housing having two or more gears contained therein, and a motor directly coupled to the two or more gears and adapted to rotate the one or more gears at a rate of about 10 rpm to about 1200 rpm. The mixed polymer is then pressurized within the gear pump to transfer the mixed polymer for further processing.

In at least another specific embodiment, the method includes providing polyolefin particles to a twin screw extruder or continuous mixer where the twin screw extruder or continuous mixer includes a housing having two or more rotatable members contained therein. Each rotatable member has a shaft coupled thereto. A motor having a drive shaft is directly coupled to the shaft of at least one of the two or more rotatable members. The two or more rotatable members are rotated at a speed of the motor drive shaft without gear reduction. The polymer particles are melted within the housing to provide a polymer melt, and the polymer melt is advanced through the housing.

In one or more embodiments above or elsewhere herein, the two or more rotatable members are twin screws or twin rotors or intermeshing gears, or any combinations thereof.

In one or more embodiments above or elsewhere herein, the apparatus is a twin screw extruder. In one or more embodiments above or elsewhere herein, the apparatus is a continuous mixer. In one or more embodiments above or elsewhere herein, the apparatus is a fully, partially or non-intermeshing, co-rotating or counter-rotating twin screw extruder. In one or more embodiments above or elsewhere herein, the apparatus is a fully, partially or non-intermeshing, co-rotating or counter-rotating continuous mixer.

In one or more embodiments above or elsewhere herein, the motor is a variable speed motor or a constant speed motor or a variable speed AC motor or a variable speed DC motor, or a constant speed AC motor, or a constant speed DC motor.

In one or more embodiments above or elsewhere herein, the motor drive shaft rotates at a rate of about 450, 514, 600, 720, 900 or 1200 rpm or more. In one or more embodiments above or elsewhere herein, the motor drive shaft rotates at a rate of about 200 rpm to about 3600 rpm.

While the foregoing is directed to embodiments of the present invention, other and further embodiments of the invention may be devised without departing from the basic scope thereof, and the scope thereof is determined by the claims that follow.

What is claimed is:

1. A method for polyolefin production, comprising:
    directing a polyolefin through a continuous mixer to provide a molten polymer, the continuous mixer comprising:
        a first housing having two or more non-intermeshing screws contained therein; and
        a motor directly coupled to the two or more screws and adapted to counter-rotate the two or more screws at a rate of about 600 rpm or more;
    adding one or more additives to the molten polymer within the first housing;
    mixing the molten polymer and the one or more additives to provide a mixed polymer comprising the one or more additives at least partially dispersed therein;
    directing the mixed polymer to a gear pump comprising:
        a second housing having two or more gears contained therein; and
        a motor directly coupled to at least one of the two or more gears and adapted to rotate the two or more gears at a rate of about 10 rpm to about 1200 rpm; and
    pressurizing the mixed polymer within the gear pump to transfer the mixed polymer for further processing.

2. The method of claim 1, wherein the molten polymer is mixed at a variable speed.

3. The method of claim 1, wherein the motor drive shaft of the motor in the continuous mixer rotates at a rate of about 600 rpm to about 3600 rpm.

4. The method of claim 1, wherein the motor drive shaft of the motor in the continuous mixer rotates at a rate of 720 rpm or more.

5. The method of claim 1, wherein the motor drive shaft of the motor in the continuous mixer rotates at a rate of 900 rpm or more.

* * * * *